US012755560B2

(12) United States Patent
Li et al.

(10) Patent No.: US 12,755,560 B2
(45) Date of Patent: Oct. 6, 2026

(54) DETECTION METHOD AND SYSTEM FOR A MOBILE OBJECT

(71) Applicant: Agency for Science, Technology and Research, Singapore (SG)

(72) Inventors: Jun Li, Singapore (SG); Syed Zeeshan Ahmed Mukhtar, Singapore (SG); Wei Yun Yau, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 273 days.

(21) Appl. No.: 18/283,126

(22) PCT Filed: Mar. 29, 2022

(86) PCT No.: PCT/SG2022/050175
§ 371 (c)(1),
(2) Date: Sep. 20, 2023

(87) PCT Pub. No.: WO2022/211733
PCT Pub. Date: Oct. 6, 2022

(65) Prior Publication Data

US 2024/0161517 A1 May 16, 2024

(30) Foreign Application Priority Data

Mar. 31, 2021 (SG) ........................... 10202103330Q

(51) Int. Cl.
*G06V 20/56* (2022.01)
*G01S 17/89* (2020.01)
*G06T 7/13* (2017.01)

(52) U.S. Cl.
CPC ............ *G06V 20/588* (2022.01); *G01S 17/89* (2013.01); *G06T 7/13* (2017.01)

(58) Field of Classification Search
CPC ................................ G06T 7/13; G06V 20/588
See application file for complete search history.

(56) References Cited

U.S. PATENT DOCUMENTS

| | | | | |
|---|---|---|---|---|
| 10,891,518 | B1 * | 1/2021 | Joshi | G06N 20/20 |
| 2011/0060478 | A1 | 3/2011 | Nickolaou | |

(Continued)

FOREIGN PATENT DOCUMENTS

| | | |
|---|---|---|
| CN | 106570446 | 4/2017 |
| CN | 109522804 | 3/2019 |
| CN | 110598541 | 12/2019 |

OTHER PUBLICATIONS

Intellectual Property Office of Singapore, International Search Report and Written Opinion for International Patent Application No. PCT/SG2022/050175.

(Continued)

*Primary Examiner* — Jess Whittington
(74) *Attorney, Agent, or Firm* — Williams Mullen; F. Michael Sajovec

(57) ABSTRACT

A method of detecting a raised boundary of a routeway for a mobile object 100 is disclosed herein. In a specific embodiment, the method comprises receiving LiDAR data of an environment of the mobile object captured by a LiDAR device 101, the LiDAR data comprising a plurality of beams, each beam comprising a plurality of projected points each captured according to a common pitch angle of the LiDAR device 101; identifying a plurality of break points, each break point of the plurality of break points being in a linearity 501, 1501, 2501 of consecutive projected points of at least one beam from the plurality of beams; and locating edge points of the raised boundary from the plurality of identified break points. A system for detecting a raised boundary of a routeway for a mobile object 100 is also disclosed herein.

13 Claims, 10 Drawing Sheets

(56) References Cited

U.S. PATENT DOCUMENTS

| | | | | |
|---|---|---|---|---|
| 2014/0297092 | A1* | 10/2014 | Delp | G05D 1/024 701/25 |
| 2016/0026184 | A1* | 1/2016 | Stainvas Olshansky | G01S 17/89 356/4.01 |
| 2016/0147915 | A1* | 5/2016 | Pope | G06F 30/13 703/1 |
| 2019/0340447 | A1* | 11/2019 | Wei | G06V 20/588 |
| 2022/0026920 | A1* | 1/2022 | Ebrahimi Afrouzi | G06N 3/0495 |
| 2022/0270268 | A1* | 8/2022 | Radha | G06V 10/7715 |
| 2022/0390608 | A1* | 12/2022 | Park | G01S 17/931 |

OTHER PUBLICATIONS

Intellectual Property Office of Singapore LLP, International Search Report and Written Opinion, International Patent Application No. 11202306885X, Aug. 13, 2024.

* cited by examiner

DETECTION METHOD AND SYSTEM FOR A MOBILE OBJECT

CROSS-REFERENCE TO RELATED APPLICATIONS

This application is the U.S. national phase of international patent application PCT/SG2022/050175 filed on Mar. 29, 2022 which claims the benefit of Singapore patent application Ser. No. 10202103330Q filed on Mar. 31, 2021, the entire disclosures of which are incorporated herein by way of reference.

BACKGROUND AND FIELD

The invention relates to a detection method and system for a mobile object, in particular a method and system of detecting a raised boundary of a routeway for a mobile object, and a method and system of detecting a lane and a raised boundary of a routeway for a mobile object.

The accurate detection of raised boundaries (e.g. kerbs) and lanes of routeways such as roads, lanes and paths is important for mobile objects such autonomous vehicles (AVs) and mobile robots, in particular from the perspective of regularization and risk management. Specifically, with regard to regularization, raised boundaries and lanes may assist accurate localization of mobile objects, particularly in circumstances in which other features enabling localization are lacking, such as on a highway, for example. With regard to risk management, it will be appreciated that raised boundaries and lanes may define the routeway boundaries and may present obstacles to the movement of a mobile device across the terrain and therefore may need to be avoided.

Raised routeway boundaries and lanes present particular challenges with regard to detection. Firstly, manoeuvring a mobile object close to a raised boundary (e.g. buses driving into a bus stop with a kerb or a mobile robot climbing the kerb) requires precise adjustments of the mobile object and therefore a high level of detection accuracy—ideally at a pixel level—is desirable. However, sensor errors and non-ideal routeway surfaces make such accuracy hard to achieve.

Further, there is a wide variation in the types of routeway markings and raised boundary types and shapes in existence. FIG. 1*a* illustrates some of the variation in road kerb shapes in existence. Specifically, a cross junction 901 and a U-turn 903 are illustrated in FIG. 1*a*. Both the cross junction 901 and the U-turn 903 include relatively shorter kerb structures 905 as well as relatively longer kerb segments 907. It will be appreciated that detection of the relatively shorter kerb structures 905 which are isolated from other road structures, such as traffic islands, safety humps or road dividers, may be just as critical from a road safety perspective as detection of the relatively longer kerb segments 907.

In addition, the shape of a routeway surface may vary, adding to the complexity of detection. For example, a road may be designed with a drainage gradient resulting in a slanted road surface, with its highest point at the centre. This is illustrated in FIG. 1*b* which shows point cloud LiDAR data of a road 910 with a curved profile. From FIG. 1*b* it will be appreciated that the centre 909 of the road 910 is its highest point, with the road surface curving downwards towards opposing kerbs 911.

Existing approaches to raised boundary and lane detection are typically directed to determining the two nearest kerbs along the driving direction of the mobile object. However, such approaches may fail to accurately detect more complex raised boundary and lane environments such as shorter kerb structures 905 and other lane features, and may not be capable of accounting for a curved routeway surface.

It is desirable to provide a method and system of detecting a raised boundary of a routeway for a mobile object which addresses at least one of the drawbacks of the prior art and/or to provide the public with a useful choice.

SUMMARY

In a first aspect, there is provided a method of detecting a raised boundary of a routeway for a mobile object. The method comprises receiving LiDAR data of an environment of the mobile object captured by a LiDAR device, the LiDAR data comprising a plurality of beams, each beam comprising a plurality of projected points each captured according to a common pitch angle of the LiDAR device; identifying a plurality of break points, each break point of the plurality of break points being in a respective linearity of consecutive projected points of at least one beam from the plurality of beams; and locating edge points of the raised boundary from the plurality of identified break points. By identifying break points in a linearity of consecutive projected points of at least one beam from the plurality of beams, precise, pixel level detection of raised boundaries, such as kerbs, may be possible.

Note that as used herein, the term raised boundary of a routeway is intended to encompass any raised border or edge of a lane, road, or path, including but not limited to kerbs.

Preferably, identifying each respective break point of the plurality of break points further comprises: determining first selected consecutive projected points of the at least one beam including a respective candidate break point; determining at least one opposing projected points of the at least one beam; determining an angle between a selected linearity of the selected consecutive points and an opposing linearity of the at least one opposing projected point and the candidate break point; and identifying the respective break point based on the determined angle.

In a specific embodiment, determining the selected consecutive projected points of the at least one beam comprises: determining first consecutive projected points of the at least one beam including the respective candidate break point; determining second consecutive projected points of the at least one beam including the respective candidate break point; comparing a first linearity of the first consecutive projected points with a second linearity of the second consecutive projected points; and selecting the first or second consecutive projected points as the selected consecutive projected points based on the comparison. This may enable smoothing of the LiDAR point cloud while helping to ensure that edge points are retained.

Advantageously, height variations in selected projected points of the at least one beam adjacent to each of the identified break points in the at least one beam are identified and the identified plurality of break points are filtered based on the identified height variations.

It is envisaged that grouping of identified plurality of break points into pairs based on a monotonic change in a height of the projected points of the at least one beam between the respective break points of each pair may be performed; and upper and lower edge points of the raised boundary may be located based on the grouped pairs. This may enable accurate detection of kerb edge pairs.

In a specific embodiment, the method comprises identifying a first plurality of break points, each break point of the first plurality of break points being in a respective linearity of consecutive projected points of a first beam from the plurality of beams; identifying a second plurality of break points, each break point of the second plurality of break points being in a respective linearity of consecutive projected points of a second beam from the plurality of beams; locating first edge points of the raised boundary from the identified first plurality of break points; locating second edge points of the raised boundary from the identified second plurality of edge points; and determining a piece-wise representation of the raised boundary by tracing straight lines from each of the respective first edge points to each of the respective second edge points.

It is envisaged that routeway marking edge points may also be extracted from the LiDAR data and lane edge points may be located based on the extracted routeway marking edge points. Preferably, locating edge points of the raised boundary from the plurality of identified break points and locating lane edge points based on the extracted routeway marking edge points comprises: fitting parallel linear models to selected points of the plurality of identified break points and to selected points of the extracted routeway marking edge points respectively to simultaneously generate respective lane and raised boundary models.

Advantageously, fitting parallel linear models to selected points of the plurality of identified break points and to selected points of the extracted routeway marking edge points respectively to simultaneously obtain respective lane and raised boundary models comprises: applying random sample consensus (RANSAC) to optimize parameters of the parallel linear models with respect to the plurality of identified break points and the extracted routeway marking edge points, respectively.

In a second aspect there is provided a method of lane and raised boundary detection for a mobile object. The method comprises: determining a set of raised boundary edge candidates; determining a set of lane marking edge candidates; fitting parallel linear models to selected candidates of the set of raised boundary edge candidates and to selected candidates of the set of lane marking edge candidates to simultaneously obtain respective lane and raised boundary models. Fitting parallel linear models to selected candidates of the set of raised boundary edge candidates and to selected candidates of the set of lane marking edge candidates to simultaneously obtain respective lane and raised boundary models may enable accurate distinction to be made between lane markings and other types of road markings. Preferably, fitting parallel linear models to selected candidates of the set of raised boundary edge candidates and selected candidates of the set of lane edge candidates to simultaneously generate lane and raised boundary models, respectively comprises: applying random sample consensus (RANSAC) to optimize parameters of the parallel linear models with respect to the determined set of raised boundary edge candidates and to the determined set of lane edge candidates, respectively.

In a third aspect, there is provided a system for detecting a raised boundary of a routeway for a mobile object, the system comprising: a LiDAR device arranged to capture LiDAR data of an environment of the mobile object at a plurality of pitch angles, the LiDAR data comprising a plurality of beams, each beam comprising a plurality of projected points each captured according to a common pitch angle of the plurality of pitch angles; a processor configured to: identify a plurality of break points, each break point of the plurality of break points being in a respective linearity of consecutive projected points of at least one beam from the plurality of beams; and locate edge points of the raised boundary from the plurality identified break points.

Preferably, the processor is configured to identify each respective break point of the plurality of break points by: determining selected consecutive projected points of the at least one beam including a respective candidate break point; determining at least one opposing projected point of the at least one beam; determining an angle between a selected linearity of the selected consecutive points and an opposing linearity of the at least one opposing projected point and the candidate break point; and identifying the respective break point based on the determined angle. In a specific embodiment, determining the selected consecutive projected points of the at least one beam comprises: determining first consecutive projected points of the at least one beam including the respective candidate break point; determining second consecutive projected points of the at least one beam including the respective candidate break point; comparing a first linearity of the first consecutive projected points with a second linearity of the second consecutive projected points; and selecting the first or second consecutive projected points as the selected consecutive projected points based on the comparison.

Advantageously, the processor is further configured to identify height variations in selected projected points of the at least one beam adjacent to each of the plurality of identified break points and to filter the plurality of identified break points based on the identified height variations.

It is envisaged that the processor may also be configured to group the plurality of identified break points into pairs based on a monotonic change in a height of the projected points of the at least one beam between the respective break points of each pair; and locate upper and lower edge points of the raised boundary based on the grouped pairs.

In a specific embodiment, the processor is further configured to: identify a first plurality of break points, each break point of the first plurality of break points being in a respective linearity of consecutive projected points of a first beam from the plurality of beams; identify second break points, each break point of the second plurality of break points being in a respective linearity of consecutive projected points of a second beam from the plurality of beams; locate first edge points of the raised boundary from the identified first break points; locate second edge points of the raised boundary from the identified second edge points; and determine a piece-wise representation of the raised boundary by tracing straight lines from each of the respective first edge points to each of the respective second edge points.

It is envisaged that the processor may be further configured to extract routeway marking edge points from the LiDAR data based on adaptive thresholding; and locate lane edge points based on the extracted routeway marking edge points. Preferably, the processor is configured to locate lane edge points based on the extracted routeway marking edge points by: fitting parallel linear models to selected points of the plurality of identified break points and to selected points of the extracted routeway marking edge points respectively to simultaneously generate lane and raised boundary models.

In a fourth aspect, there is provided a system for detecting a lane and a raised boundary for a mobile object, the system comprising: a LiDAR device arranged to capture LiDAR data of an environment of the mobile object at a plurality of pitch angles, the LiDAR data comprising a plurality of beams, each beam comprising a plurality of projected points each captured according to a common pitch angle of the plurality of pitch angles; a processor configured to: determine a set of raised boundary edge candidates from the LiDAR data; determine a set of lane marking edge candidates from the LiDAR data; and fit parallel linear models to selected candidates of the set of raised boundary edge candidates and to selected candidates of the set of lane marking edge candidates respectively to simultaneously generate lane and raised boundary models. Preferably, fitting parallel linear models to selected candidates of the set of raised boundary edge candidates and selected candidates of the set of lane edge candidates to simultaneously generate lane and raised boundary models, respectively comprises: applying random sample consensus (RANSAC) to optimize parameters of the parallel linear models with respect to the determined set of raised boundary edge candidates and to the determined set of lane edge candidates, respectively.

In a fifth aspect, there is provided a mobile object comprising a system for detecting a raised boundary of a routeway for a mobile object, the system comprising: a LiDAR device arranged to capture LiDAR data of an environment of the mobile object at a plurality of pitch angles, the LiDAR data comprising a plurality of beams, each beam comprising a plurality of projected points each captured according to a common pitch angle of the plurality of pitch angles; a processor configured to: identify a plurality of break points, each break point of the plurality of break points being in a respective linearity of consecutive projected points of at least one beam from the plurality of beams; and locate edge points of the raised boundary from the plurality identified break points.

In a sixth aspect, there is provided a mobile object comprising a system for detecting a lane and a raised boundary for a mobile object, the system comprising: a LiDAR device arranged to capture LiDAR data of an environment of the mobile object at a plurality of pitch angles, the LiDAR data comprising a plurality of beams, each beam comprising a plurality of projected points each captured according to a common pitch angle of the plurality of pitch angles; a processor configured to: determine a set of raised boundary edge candidates from the LiDAR data; determine a set of lane marking edge candidates from the LiDAR data; and fit parallel linear models to selected candidates of the set of raised boundary edge candidates and to selected candidates of the set of lane marking edge candidates respectively to simultaneously generate lane and raised boundary models.

In a seventh aspect, there is provided a transitory or non-transitory computer readable medium storing instructions which, when executed by a processor, cause the processor to perform a method of detecting a raised boundary of a routeway for a mobile object. The method comprises receiving LiDAR data of an environment of the mobile object captured by a LiDAR device, the LiDAR data comprising a plurality of beams, each beam comprising a plurality of projected points each captured according to a common pitch angle of the LiDAR device; identifying a plurality of break points, each break point of the plurality of break points being in a respective linearity of consecutive projected points of at least one beam from the plurality of beams; and locating edge points of the raised boundary from the plurality of identified break points.

In an eighth aspect, there is provided a transitory or non-transitory computer readable medium storing instructions which, when executed by a processor, cause the processor to perform a method of lane and raised boundary detection for a mobile object. The method comprises: determining a set of raised boundary edge candidates; determining a set of lane marking edge candidates; fitting parallel linear models to selected candidates of the set of raised boundary edge candidates and to selected candidates of the set of lane marking edge candidates to simultaneously obtain respective lane and raised boundary models.

In a ninth aspect, there is provided a LIDAR-based kerb and lane detection method for autonomous robots or vehicles, the method comprising correcting the pose through Random Sample Consensus (RANSAC), classifying candidate points from per beam tracing of a LiDAR scan, detecting the kerb in the LiDAR scan through edge detection, linking upper and lower kerb edge points, and finding segments of kerb and lanes through RANSAC; wherein detecting the kerb in the LiDAR scan through edge detection further comprising a pre-processing step of a side window filtering to remove the noise from the sensors or non-perfect road surface while retaining the edge points; and a post-processing step of checking height variance by Pair-wise kerb edge filtering to link the upper and lower kerb edge points to form the precise kerb surface; and performing piecewise representation for kerb and lane to link the upper and lower kerb edge points respectively.

It is envisaged that features relating to one aspect may be applicable to the other aspects.

BRIEF DESCRIPTION OF THE DRAWINGS

An exemplary embodiment will now be described with reference to the accompanying drawings in which.

DETAILED DESCRIPTION OF PREFERRED EMBODIMENT

Figure 2:
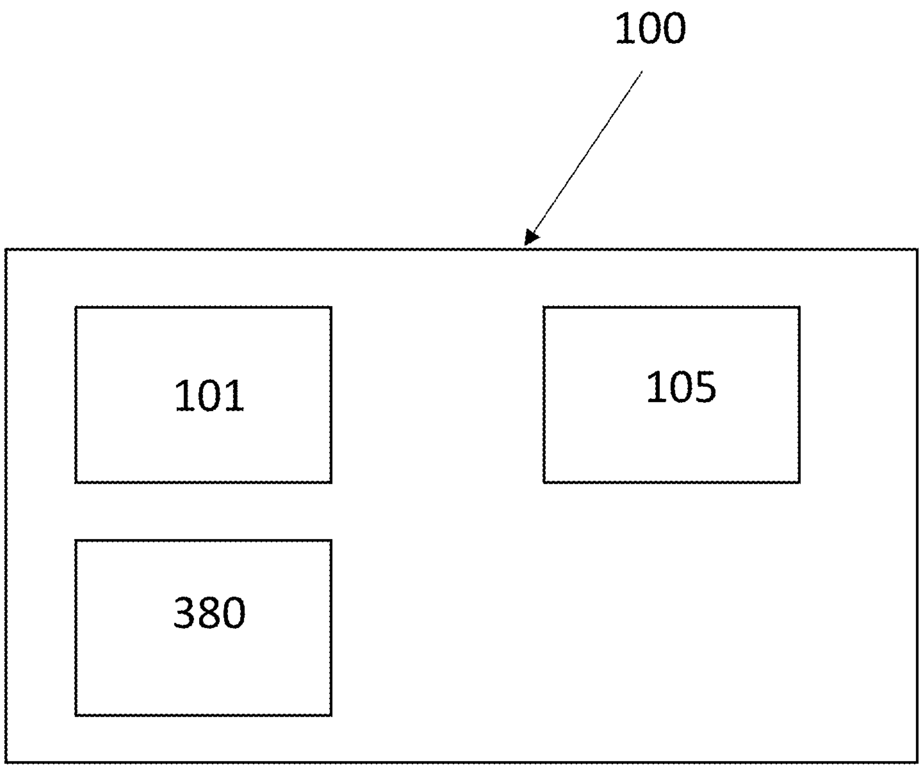
FIG. 2 illustrates a simplified block diagram of a mobile object according to a preferred embodiment.

FIG. 2 is a simplified block diagram of a mobile object 100, for example an autonomous vehicle (AV) or a mobile robot, according to the described embodiment. The mobile object 100 is configured to manoeuvre with respect to a routeway such as a road, a path, a track, or similar.

The mobile object 100 includes a Light Detection and Ranging Sensor (LiDAR) device 101, which is mounted to the mobile object 100, and is configured to capture data of an environment of the mobile robot 100 including features of the routeway with respect to which the mobile object 100 is configured to manoeuvre. Specifically, the LiDAR device 101 is in the form of a multi-layer LiDAR device having a plurality of pitch angles and, as such, the data captured by the LiDAR device is arranged in a plurality of beams, each beam comprising a plurality of 3-D projected points (including distance information) each captured according to a common pitch angle of the LiDAR device, i.e. in the same layer. Suitable LiDAR devices are commercially available, for example VLP-16 (Velodyne LiDAR®).

It will be appreciated that the horizontal angular resolution (i.e. the angular difference between two consecutive points from the same layer) within a beam captured with such a device is typically higher than between beams. For example, horizontal angular resolution is typically in the range from about 0.1° to about 0.4°, whereas vertical resolution between beams is typically in the range from about 0.4° to about 2°.

The mobile object 100 further includes a computing system 380, and a controller 105. The LiDAR device 101 is configured to capture point cloud data of the surrounding environment of the mobile object 100 for processing by the computing system 380. As will be explained below, together the LiDAR device 101 and the computing system 380 form part of a boundary detection system for detecting boundaries of the routeway with respect to which the mobile object is configure to manoeuvre, specifically raised boundaries, such as kerbs and boundaries defined by markings on the routeway, such as lanes. The controller 105 is configured to control an operation of the mobile object 100 based at least in part on information received from the boundary detection system, for example in such a way as to avoid collision with a raised boundary, maintaining positioning of the mobile object 100 with respect to lane markings, or other aspects of navigation.

As such, the controller 105 may itself comprise further computing devices. The controller 105 may comprise several sub-systems for controlling specific aspects of the movement of the mobile object 100 including but not limited to a deceleration system, an acceleration system and a steering system. Certain of these sub-systems may comprise one or more actuators, for example the deceleration system may comprise brakes, the acceleration system may comprise an accelerator pedal, and the steering system may comprise a steering wheel or other actuator to control the angle of turn of wheels of the mobile object 100, etc.

Figure 1A:
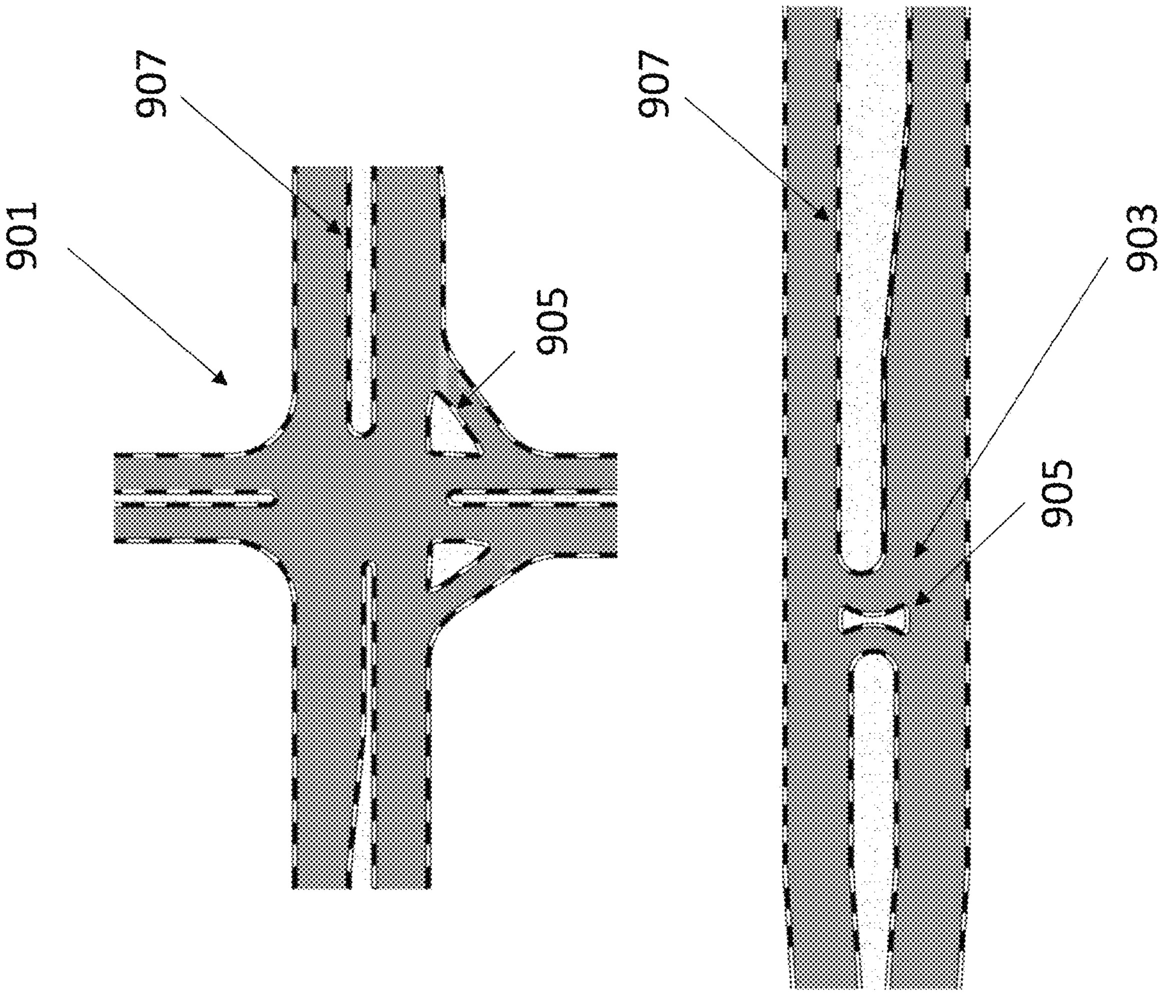
FIG. 1*a* illustrates different types of road kerb shapes in existence.
Figure 1B:
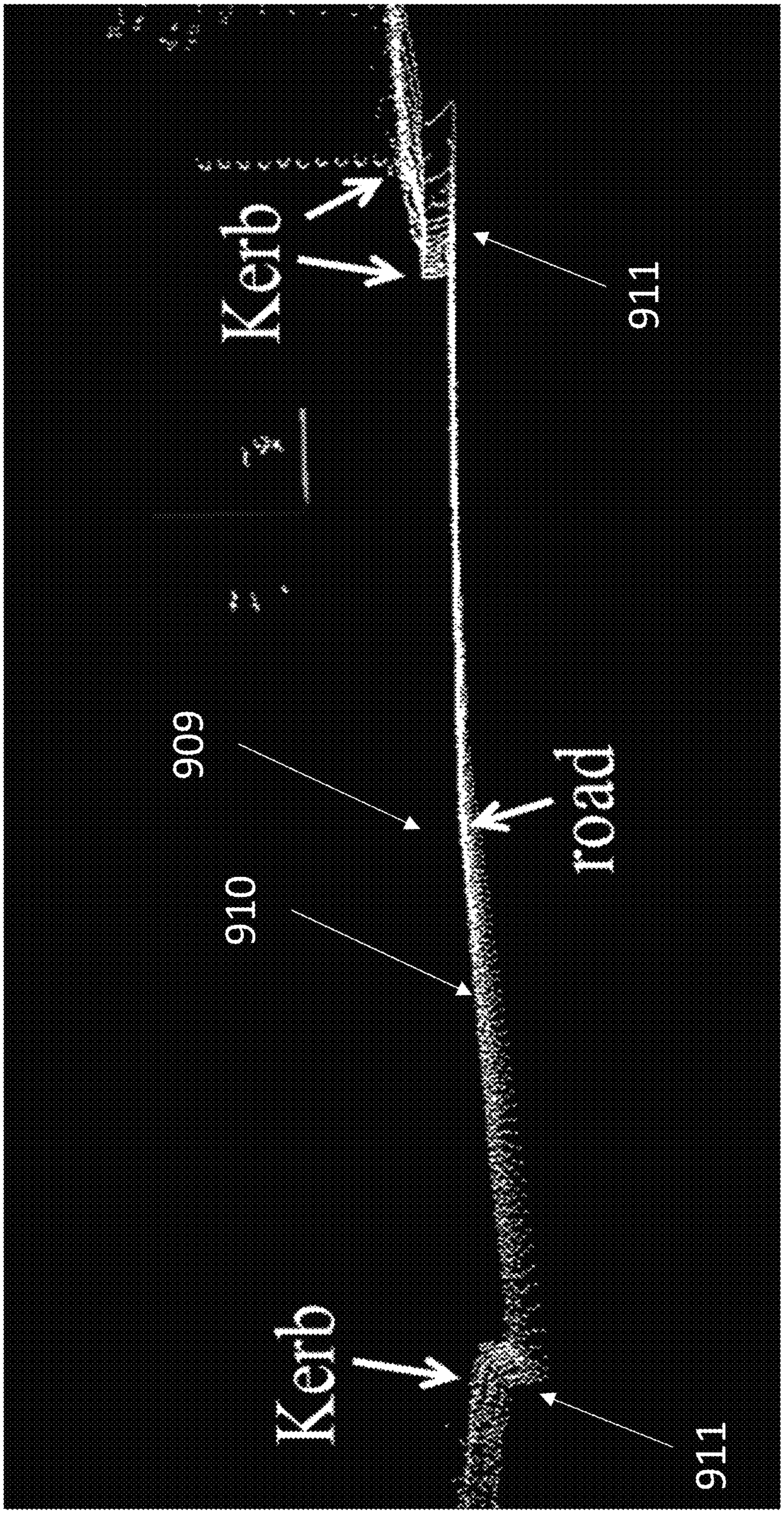
FIG. 1*b* illustrates a curved road surface.

Although the computing system 380 is shown as a separate module in FIG. 1, it is envisaged that it may form part of the controller 105. It should be appreciated that although the LiDAR device 101 functions as part of the boundary detection system in combination with the computing system 380, it may also provide data directly to the controller 105 for use in other features of the mobile device 100.

Figure 3:
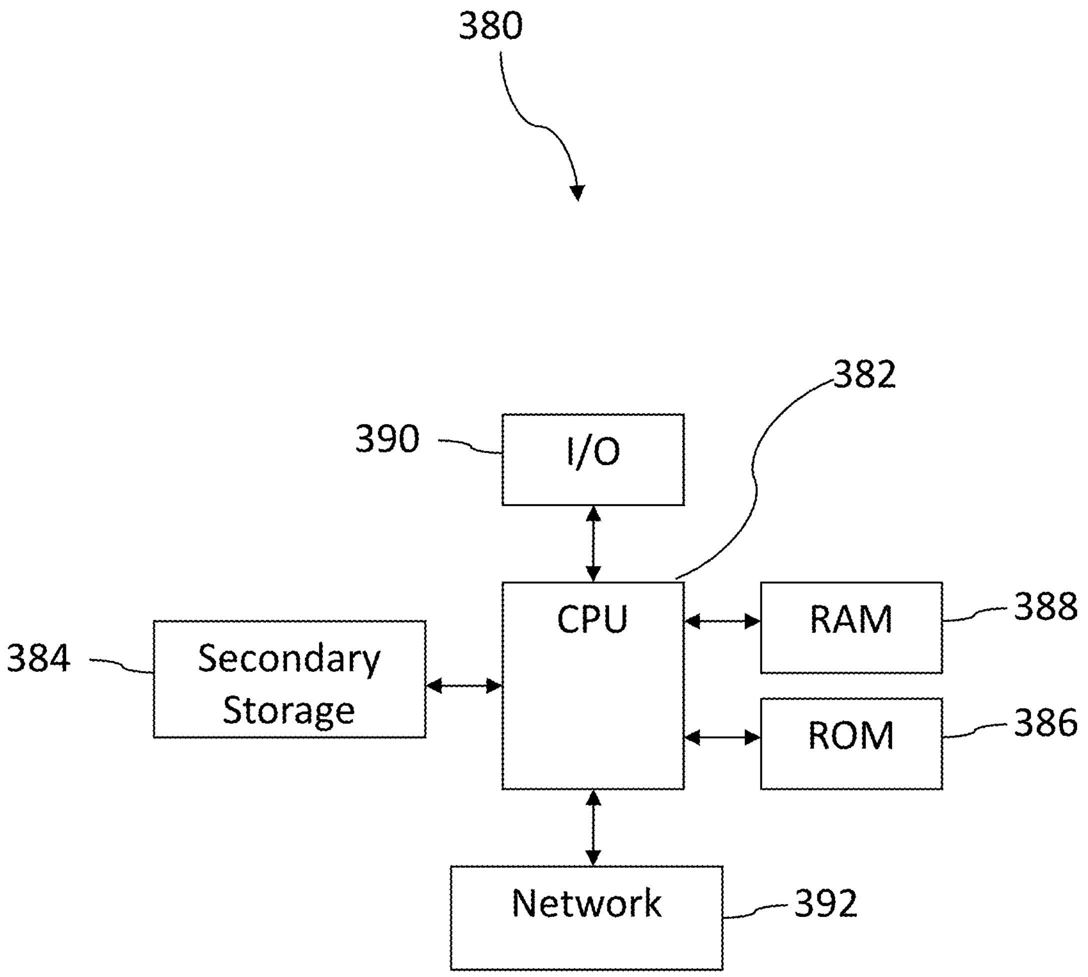
FIG. 3 illustrates a computer system forming part of a boundary detection system of the mobile object of FIG. 2.

FIG. 3 illustrates an exemplary hardware structure of the computing system 380. The computing system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computing system 380, at least one of the CPU 382, the RAM 388, the ROM 386 are changed, transforming the computing system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computing system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the raised boundary detection and/or lane detection according to the described embodiment. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 include a wireless or wired connection to the LiDAR device 101 for receiving data from the LiDAR device 101 and/or a wireless or wired connection to the controller 105 for transmitting information regarding the location of a raised boundary or lane so that the controller 105 can control the operation of the mobile object 100 accordingly. The I/O devices 390 may also include an inertial measurement unit (IMU). The I/O devices 390 may alternatively or additionally include electronic displays such as video monitors, liquid crystal displays (LCDs), plasma displays, touch screen displays, or other well-known output devices.

The network connectivity devices 392 may enable a wireless connection to facilitate communication with other computing devices such as components of the mobile object 100, for example the LiDAR device 101 and/or controller 105 or with other computing devices not part of the mobile object 100. The network connectivity devices 392 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing raised boundary detection method according to the described embodiment. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computing system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing system 380 to provide the functionality of a number of servers that is not directly bound to the number of computers in the computing system 380. For example, virtualization software may provide twenty virtual servers on four physical computers. In an embodiment, the functionality according to the described embodiment, may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality of the described embodiment may be provided as a computer program product. The computer program product may comprise one or more computer readable storage medium having computer usable program code embodied therein to implement the functionality according to the described embodiment. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analogue magnetic tape, compact disk read only memory (CD-ROM) disks, floppy disks, jump drives, digital cards, multimedia cards, and others. The computer program product may be suitable for loading, by the computing system 380, at least portions of the contents of the computer program product to the secondary storage 384, to the ROM 386, to the RAM 388, and/or to other non-volatile memory and volatile memory of the computing system 380. The processor 382 may process the executable instructions and/or data structures in part by directly accessing the computer program product, for example by reading from a CD-ROM disk inserted into a disk drive peripheral of the computing system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computing system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computing system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Figure 4:
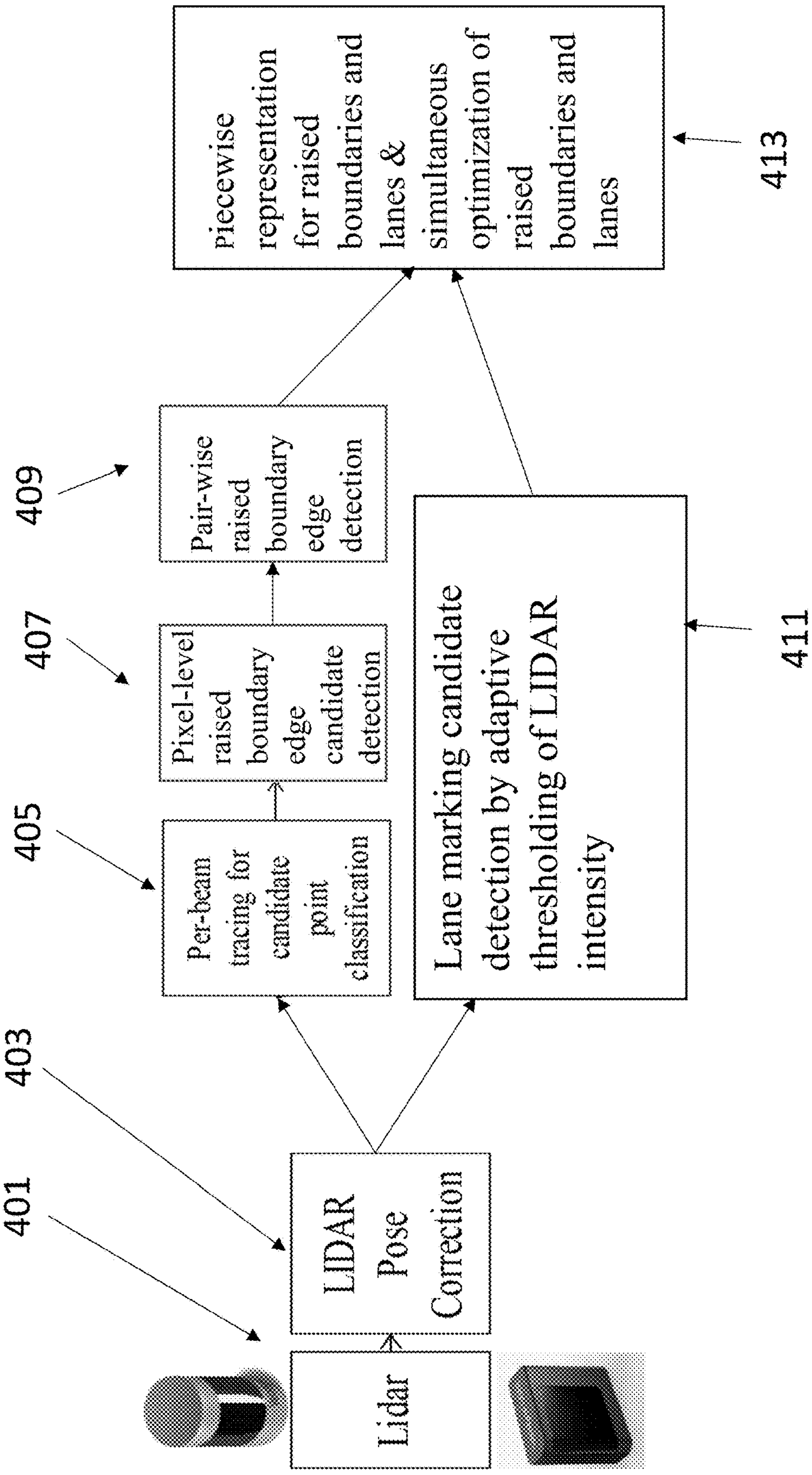
FIG. 4 illustrates a method of detecting boundaries of a routeway performed by the boundary detection system of the mobile object of FIG. 2.

FIG. 4 illustrates a method of detecting boundaries of a routeway, performed by the boundary detection system, at least in part by executing software on the CPU 382. As will be explained below, the method includes detection of a raised boundary, such as a kerb, as well as a lane defined by lane markings on the routeway.

In step 401, the LiDAR device 101 captures data of the environment of the mobile object 100. As noted above, the LiDAR data captured by the LiDAR device 101 is arranged in a plurality of beams, each beam comprising a plurality of projected points each captured according to a common pitch angle of the LiDAR device.

The LiDAR data is then received by the computing system 380 for processing by the CPU 382 in steps 403 to 413.

In step 403, LiDAR pose correction is performed. This comprises determining the relative pose of the routeway plane with respect to the LiDAR coordinate system, specifically the approximate plane normal and the height from the LiDAR origin to the plane enabling coarse estimation of the range of the routeway surface. Note that this step may be performed only once and may be done during the hardware setup.

It should be appreciated that there are a number of ways in which LiDAR pose correction may be performed. For example, a random sample consensus (RANSAC) approach to identifying the plane of the routeway surface may be employed. Open source tools for RANSAC are available. Alternatively, the pose correction may be achieved by employing data regarding the physical hardware set up of the mobile object and/or data from an onboard IMU sensor.

Once LiDAR pose correction has been performed, and the routeway plane has been coarsely estimated, the elevation of each of the captured LiDAR points can be approximately determined based on the distance from each point to the estimated routeway plane.

In addition, the distance between points from the same laser layer/channel (i.e. points belonging to the same beam) can be employed to determine the relationship of each respective point to their nearest neighbours. Specifically, in step 405, individual beam tracing is performed, that is, the analysis of each point of each LiDAR beam in turn for an initial point classification process with respect to neighbouring LiDAR points. In the described embodiment, points falling within one of the following categories are labelled accordingly:

- Isolated point: A point is labelled an isolated point if the both nearest adjacent left and right points are further than a predefined threshold from the point. For example, further than about 0.2 meters.
- Left/right end point: A point is labelled a left/right end point if the nearest adjacent left or right point to the point in question are further than a predefined threshold, for example greater than about 0.2 meters.
- Non-ground point: A point is labelled a non-ground point if the point is beyond a threshold distance from the ground, for example higher than about 0.5 meters high from the ground surface or if the point is not the nearest point to the ground among its neighbours from other beams. This process may help to eliminate points arising due to a "wall-effect"—the presence of multiple vertical lines of points at the same location above the ground—which may be generated due to on-routeway obstacles. It will be appreciated that the height of a vertical surface of a raised boundary such as kerb is typically relatively low (<30 cm), therefore very little wall effect is generated by such a raised boundary.

In step 407, raised boundary edge candidate detection for each beam is performed based on local point linearity.

Specifically beam tracing, as discussed above is performed, and break points in a linearity of consecutive points of the beam are identified as raised boundary edge candidates. This concept is illustrated in FIGS. 5*a* and 5*b*.

Figure 5A:
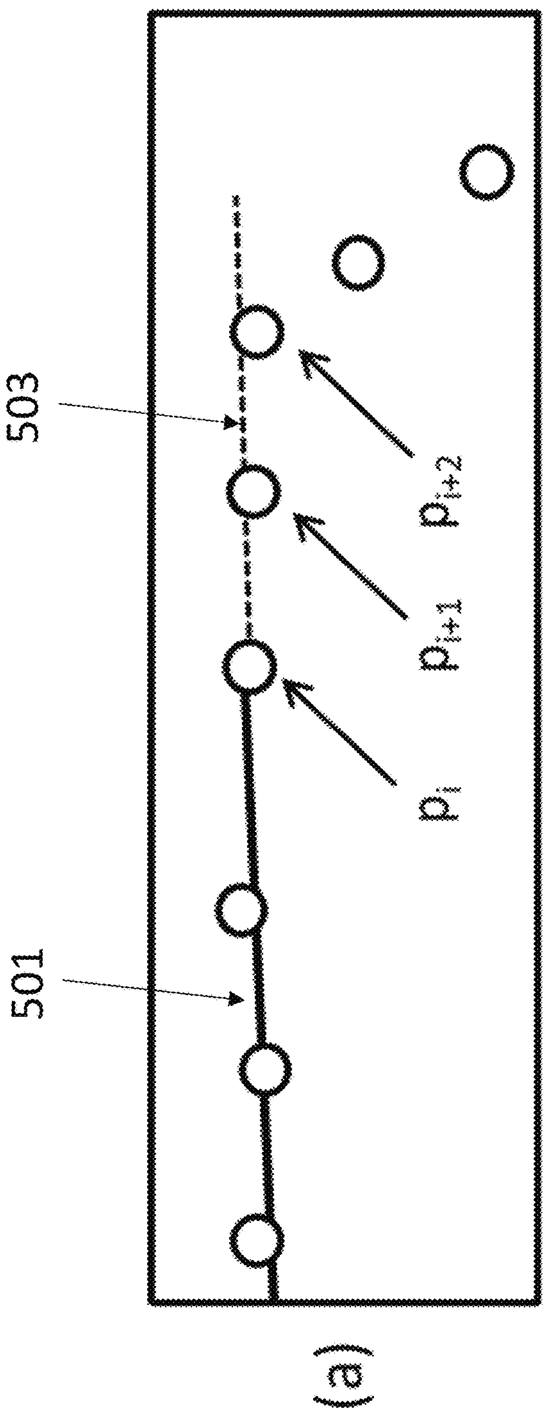
FIGS. 5*a* and 5*b* illustrate the concept of break points in a linearity of consecutive LiDAR points relevant to a step of the method of FIG. 4.

As shown in FIG. 5*a*, a linear line of best fit 501 is calculated based on the point $p_i$ and a predetermined number of points preceding or following $p_i$ (the four points preceding $p_i$ in the example given in FIG. 5*a*). $p_i$ is identified as a break point in the linearity of consecutive points of the beam if the direction from $p_i$ to the subsequent point, $p_{i+1}$, deviates from the linear line of best fit 501 by more than a predefined threshold angle. In the example of FIG. 5*a*, $p_{i+1}$ (and $p_{i+2}$) is the linear extension of the line of best fit 501 as indicated by the dashed extension line 503, and therefore the angle between the line of best fit 501 and the direction from $p_i$ to the subsequent point $p_{i+1}$ is approximately zero.

Figure 5B:
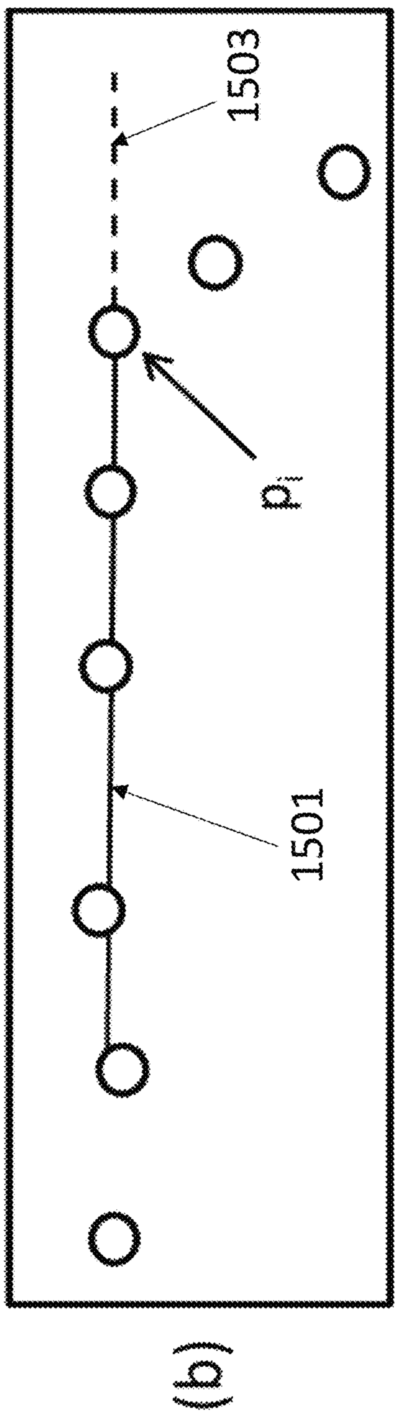

Likewise, as illustrated in FIG. 5*b* a linear line of best fit 1501 is calculated based on the point $p_i$ and a predetermined number of points preceding $p_i$. In contrast to FIG. 5*a*, however, in FIG. 5*b*, the direction from $p_i$ to $p_{i+1}$ deviates from an extension line 1503 and there is therefore no linear extension of $p_i$. $p_i$ is therefore a breakpoint in the linearity of the consecutive points preceding $p_i$ and labelled as a candidate edge point of the raised boundary.

In other words, a projected point $p_{i+1}$ is identified as a candidate edge point if there is no linear extension from one side of the point to the other side. This process exploits the fact that when a beam moves from one plane to another plane, it will change its orientation; since an edge of a raised boundary, for example a kerb, will be found at the intersection of two planes, this definition may help to ensure that the detected point is on the intersection enabling pixel-level detection.

It should be appreciated that isolated points and left/right end points may indicate points of discontinuity in the beam therefore they are not treated as candidate edge points for the purposes of steps 407-413 in order to avoid misclassification. In addition, in practice, left/right end points may be employed to segment the points of a beam and beam tracing may then be performed on these segmented pieces. Points classified as non-ground points are also excluded from consideration.

In practice, edge points of raised boundaries are determined according to the following mathematical definition:

Suppose $P_i=\{p_{ij}, j=0:N\}$ represents all the points from the $i^{th}$ beam. $E_i=\{e_{im}, m=0:M)\}$ represent all the edge points from the $i^{th}$ beam. A point $p_{ij}$ will be an edge point as shown in equation (1)

$$e_{ij} \in \{e_i\} \text{ if } |\angle p_{im} p_{ij} p_{in}| < \pi - \delta \quad (1)$$

where $-\pi < \angle p_{im} p_{ij} p_{in} < \pi$; $p_{im}$ and $p_{in}$ are two adjacent points close to $p_{ij}$. It will be appreciated from the below description that $p_{im}$ and $p_{in}$ may not be the LiDAR points immediately adjacent to $p_{ij}$ or may be points on a line of best fit rather than an actual captured LiDAR point per se. The threshold angle δ is a small positive number, for example about 30°. In other words, the angle between a linearity on one side of the candidate edge point and an opposing linearity on the opposing side of the candidate edge point is determined and the breakpoint is determined based on the determined angle.

In the described embodiment, determination of whether the angle at point $p_{ij}$ satisfies the equation (1) proceeds in the follow way.

Figure 6:
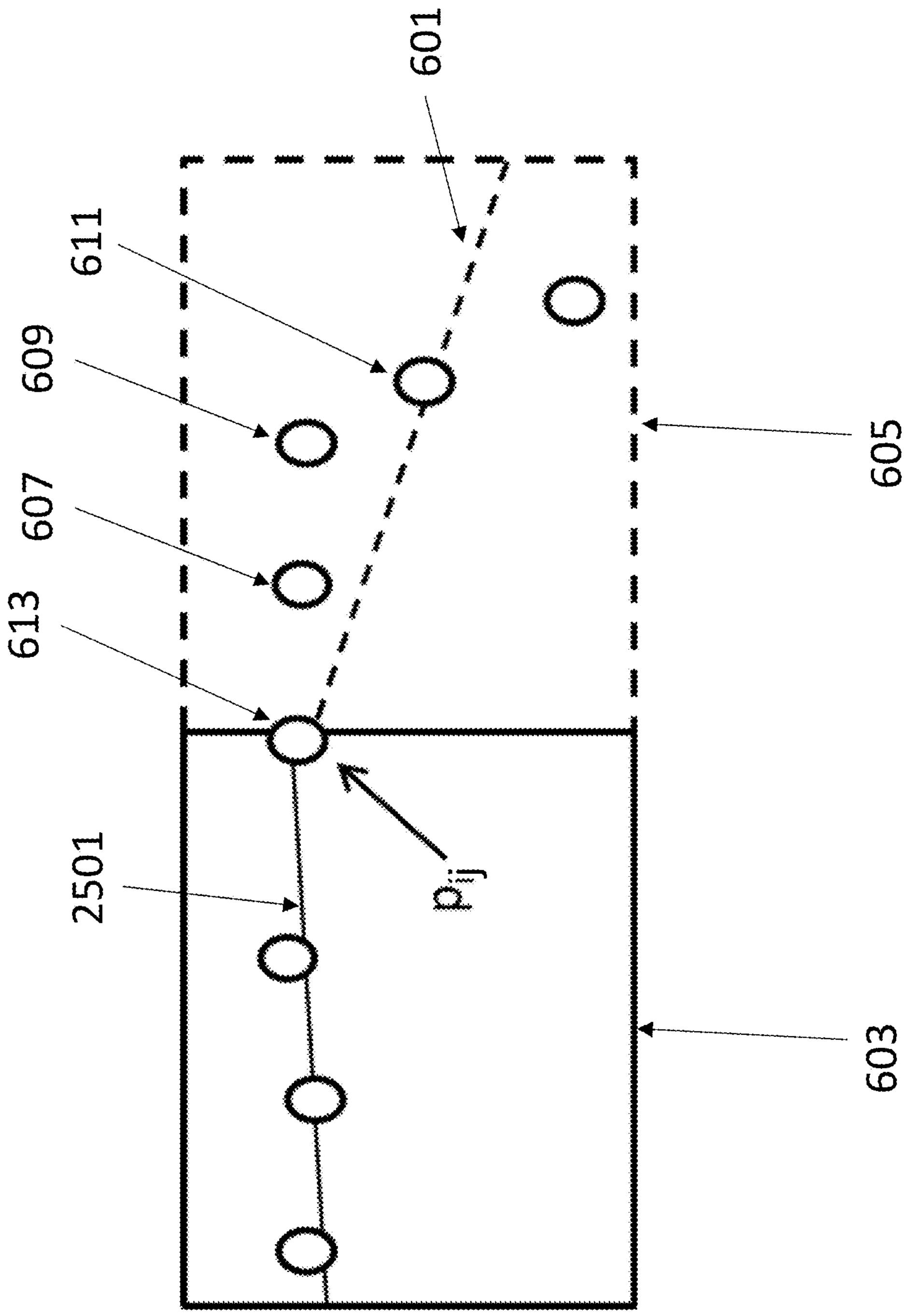
FIG. 6 illustrates side window filtering of consecutive LiDAR points performed in a step of the method of FIG. 4.

Firstly, the beam points undergo pre-processing prior to edge candidate detection as described above by analysing linearity in both directions from the point in question, i.e. in two side windows of the beam. This is illustrated in FIG. 6. In practice, the linear extension of a first line of best fit 2501 is calculated with respect to the candidate point $p_{ij}$ 613 and a first set consecutive projected points, specifically a predetermined number of points preceding the candidate point $p_{ij}$ 613 in the left-hand window 603. A second linear line of best fit 601 is also calculated with respect to the candidate point $p_{ij}$ 613 and second set of consecutive projected points, specifically the same predetermined number of points following the candidate point $p_{ij}$ 613 in the right-hand window 605.

The linearity of the points in each of the two windows 603, 605 is then compared.

As will be appreciated from FIG. 6, in the example illustrated, the left-hand window 603 has better linearity (i.e. the line of best fit 2501 is a better approximation of the points in the window 603 than the line of best fit 601 is of the points in the window 605). The line of best fit corresponding to the window with best linearity, i.e. the line of best fit 2501 in the example of FIG. 6, is then retained as a selected linearity for use in determining if the candidate point $p_{ij}$ 613 is a breakpoint. As such, the points of each side window are filtered based on their linearity.

Any point on the line of best fit 2501 is then selected as $p_{im}$ in equation (1). In contrast, a single projected point opposing the selected linearity (that is, in the opposing window 605 to that of the line of best fit 2501) is employed as $p_{in}$. In the described embodiment, the first point 607 immediately adjacent to the candidate point $p_{ij}$ 613 in the opposing window 205 is first selected for use as $p_{in}$ in equation (1).

In other words, a direction $\alpha_i$ from the candidate point $p_{ij}$ 613 to the point 607 is compared with a direction θ of the line of best fit 2501 of the linearity selected by side-window filtering using equation (1).

In the described embodiment, the above process is then repeated with the subsequent point adjacent to the candidate point $p_{ij}$ 613, i.e. by selecting point 609 as $p_{in}$ in equation (1) and verifying the angle between a direction $\alpha_i$ from the candidate point $p_{ij}$ 613 to the point 609 and the direction θ of the line of best fit 2501 as an additional check on the classification of the candidate point $p_{ij}$ 613.

Finally, the third consecutive point 611 from the candidate point $p_{ij}$ 613 is employed as $p_{in}$ in equation (1) and an angle between a direction $\alpha_i$ from the candidate point $p_{ij}$ 613 to the point 611 and the direction θ of the line of best fit 2501 is determined.

If any one of the three points 607, 609, 611 are the linear extension of the line of best fit 2501, i.e. if the directions $\alpha_i$ and θ are approximately parallel (i.e. the angle between them is less than $\pi-\delta$) for any one of the three points 607, 609, 611, then it is determined that there is linear extension of the line of best fit 2501 either side of the candidate point $p_{ij}$ 613 and therefore that the candidate point $p_{ij}$ 613 is not a breakpoint in the linearity of consecutive points of the $i^{th}$ beam. The above described process of checking linearity with respect to all three points 607, 609, 611 adjacent to the candidate point $p_{ij}$ 613 may help to ensure robustness against noise.

It will be appreciated from FIG. 6 that the directions $\alpha_i$ for both of the two points 607, 609 are substantially parallel to the line of best fit 2501 and therefore that the candidate point $p_{ij}$ 613 will not be classified as a breakpoint in the linearity of consecutive points of the $i^{th}$ beam using the process described above, consistent with the LiDAR data shown in FIG. 6.

Pre-processing in this way enables smoothing of the point cloud arising from the single beam while helping to ensure that edge points are retained.

Further, post-processing to filter the identified break points is also performed according to the described embodiment. Specifically, it will be appreciated that edge points of raised boundaries have differing heights on either side of the edge point. For example, points located on a road or pavement will each have a similar height while points along the kerb surface will monotonically increase (or decrease). Identified break points are therefore examined to ensure that points on one side of the break point have approximately the same height and points on the other side of the break point monotonically increase or decrease. As noted above, the elevation of each of the captured LiDAR points can be determined based on the distance from the point to the estimated routeway plane and the detected distance to each respective point enabling height variations in adjacent points to be determined. Identified break points are removed from the set of candidate edge points if the height variation of the adjacent points of the respective beam is not consistent with this behaviour. Thus, the identified break points are filtered based on height variations identified in adjacent projected points of the beam.

Returning now to FIG. 4, in step 409, pair-wise raised boundary edge filtering is performed.

It will be appreciated that changes in elevation between adjacent LiDAR projection points may indicate which side of the current edge point the surface of the raised boundary is located. For example, with respect to an upper edge point, the raised boundary surface will be expected to be pointing downwards to the ground. In contrast, relative to the position of the lower edge point of the raised boundary, the raised boundary surface will be expected to be pointing upwards towards the sky. In step 409, this behaviour is exploited to differentiate upper edge points from lower edge points amongst the edge points identified in step 407.

Specifically, upper and lower raised boundary edge points are expected to appear in pairs, between which the elevation of the points monotonously changes, forming approximate straight lines. According to the described embodiment, therefore, the identified break points of each beam are filtered by grouping them into pairs based on a monotonic change in a height of the projected points of the at least one beam between the respective break points of each pair and each member of the pair classified as an upper or lower edge point of the raised boundary based on the direction of monotonic change. Again, this may be determined by extracting elevation information based on the distance from a given point to the routeway surface.

In the described embodiment, in order to further reduce potential false detection due to, for example, traffic islands or other road obstacles, local region flatness is also verified based on the classified lower edge point and its connected routeway region.

This process is performed as follows: Taking n consecutive points preceding or following each classified lower edge point in the direction of the routeway, RANSAC is applied to extract the routeway surface near the raised boundary. Once the near routeway surface is found, pairs with lower edge points higher than the extracted surface are considered invalid as raised boundary edge point candidates. The heights of the corresponding upper raised boundary edge points to the extracted routeway surface are also calculated. If the height of an upper raised boundary edge point is greater than a threshold distance, for example about 0.3 meters, the corresponding pair are considered invalid as raised boundary edge point candidates.

As noted above, the routeway plane estimation performed in step 403 is only a coarse estimation since it is unlikely that most of the routeway surface will be a perfect plane. Thus, the elimination of edge point candidate pairs as described above based on local region flatness and height may compensate for inaccuracies arising due to any non-planarity of the routeway surface. Such invalid pairs may arise due to, for example, additional kerb-like steps on a traffic island surface to support a traffic regulation signboard, etc.

In step 411, lane markings (if present) are extracted from the LiDAR data. This is done using, for example, adaptive thresholding based on LiDAR intensity to extract the edges of routeway markings from the LiDAR data. Specifically, discontinuous intensity changes between adjacent LiDAR points are identified (i.e. a discontinuous change from relatively higher intensity LiDAR points to relatively lower intensity LiDAR points or vice-versa) to identify the edge points of routeway markings. Open source tools for adaptive thresholding are available.

Firstly, per-beam tracing is performed as described above to identify segments of each beam comprising high intensity LiDAR points. The two endpoints of each of the segments are labelled as candidate boundary, or edge points for a lane marking. The lane marking edge points are then classified into right and left edge points according to the direction of intensity change between LiDAR points (i.e. from low to high or from high to low).

In step 413, a piecewise representation for the raised boundary and lane markings is generated. This comprises tracing corresponding edge points across the beams, for example an upper edge point identified in one beam is traced to an upper edge point identified in the neighbouring beam, and so on, and a piecewise representation linking the two is thereby generated. In other words, the piecewise representation assigns each identified edge point a direction.

An exemplary algorithm for generating the piecewise representation of a raised boundary is given in Table 1.

TABLE 1

| pseudo code for piecewise representation for raised boundary |
|---|
| For each lower/upper raised boundary edge point $\{e_{ij} \epsilon E_i,\ j = 0\sim M_i\}$ for all the beams $\{i=0\tilde{\ }N\}$ |
| 1. for i=0˜N−2 |
| For j=0˜$M_i$, k= 0˜$M_{i+1}$ |
| Form a line by $\overrightarrow{e_{ij}e_{i+1,k}}$ |
| For a = i+2 ˜N, b=0:$M_a$ |
| If ∃ $e_{ab}$ on the line $\overrightarrow{e_{ij}e_{i+1,k}}$ , *insert it into a piece*, Regenerate the line |
| Else break |
| End for a, b |
| End for j, k |
| End for i |

A corresponding algorithm is applied to the candidate lane edge points for generating a piecewise representation of the lane markings.

Once the piecewise representations of the raised boundaries and lane markings have been obtained, a simultaneous optimization of the raised boundaries and the lane markings is performed which, in the described embodiment, is achieved using a RANSAC-based approach.

Figure 7:
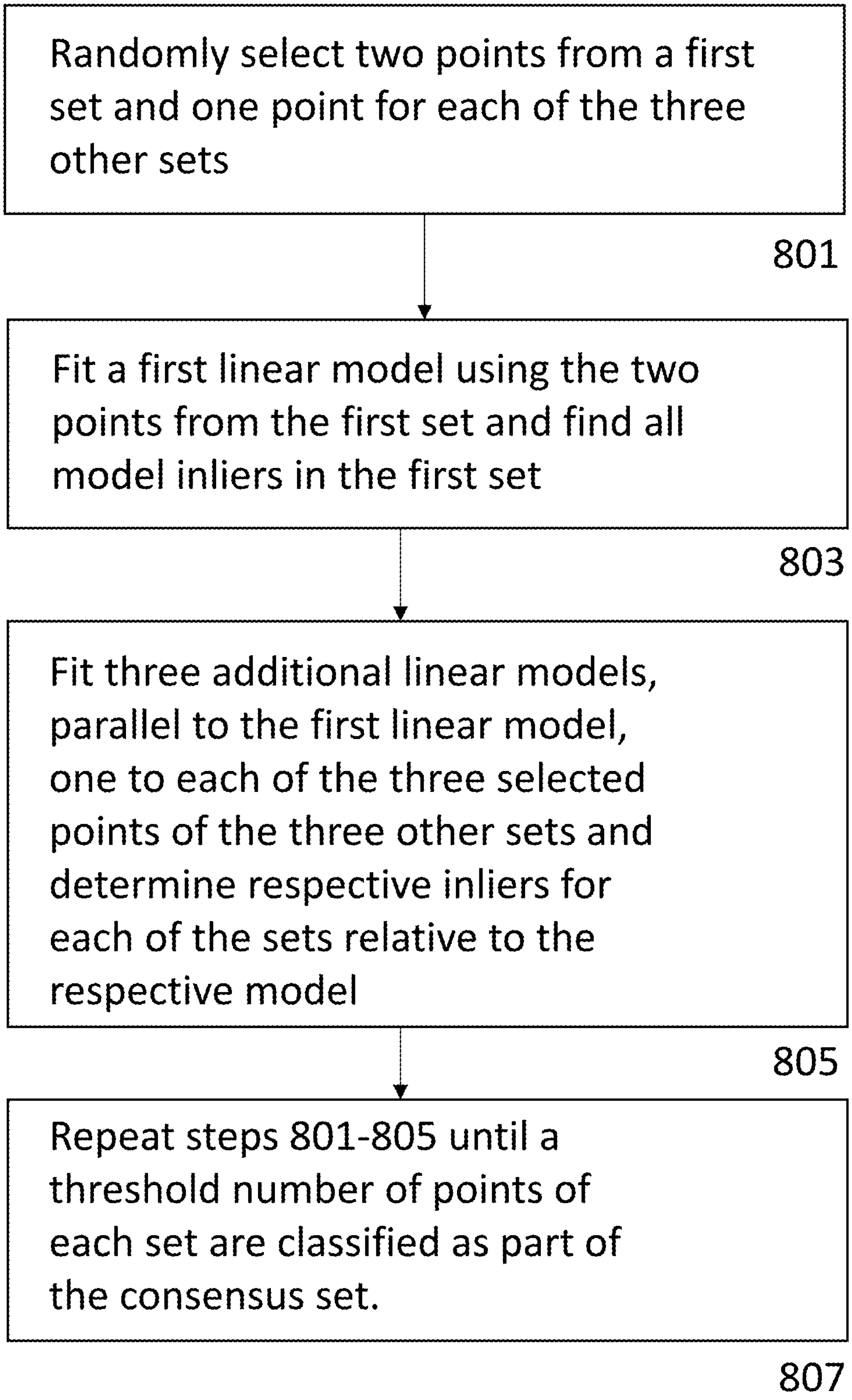
FIG. 7 illustrates a RANSAC algorithm for performing simultaneous optimization of raised boundary and the lane marking models as part of a step of the method of FIG. 4.

The RANSAC-based algorithm for performing simultaneous optimization of the raised boundaries and the lane markings is illustrated in FIG. 7 and explained below.

Given 4 sets of identified points, specifically a set of identified raised boundary lower edge points $\{e_{lc}\}$, a set of identified raised boundary upper edge points $\{e_{uc}\}$, a set of left edge lane marking candidates $\{e_{ll}\}$ and a set of right edge lane marking candidates $\{e_{rl}\}$, in step 801, two points are randomly selected from a first set and one point is randomly selected from each of a second set, a third set and a fourth set. Note that, in the described embodiment, the two points from the first set are corresponding edge points as determined in the generation of the piecewise representation described above. In other words, if a first of the two points selected from the first set is an upper edge point in one beam, then the second point will be selected from corresponding upper edge points in different beams, i.e. the second point will be selected based on the determined direction of the first edge point.

In step 803, a first linear model is fitted to the two points selected from the first set and the number of inliers to the first model is determined for the first set. It should be appreciated that this fitting is possible as the two points are corresponding points as determined in the generation of the piecewise representation described above.

In step 805, a second linear model, substantially parallel to the first linear model is fitted to the single selected point of the second set and the number of inliers to the second model is determined for the second set.

Likewise, a third linear model, substantially parallel to the first linear model is fitted to the single selected point of the third set and the number of inliers to the third model is determined for the third set.

Finally, a fourth linear model, substantially parallel to the first linear model is fitted to the single selected point of the fourth set and the number of inliers to the fourth model is determined for the fourth set.

In step 807, it is determined if the number of determined inliers to each of the first, second, third and fourth models (i.e. the number of points classified as part of the consensus set) is greater or equal to a threshold number for each set and, if not, the method repeats steps 801-805. For example, the method may repeat until points from at least a certain percentage of the total number of beams of the LiDAR data (for example, about a quarter of the total number of beams of the LiDAR data) are included in the consensus set. For example, for data captured by a VLP-16 LiDAR device, the method may repeat until LiDAR points from at least four beams are included in the consensus set. Alternatively, or additionally, the method may terminate if a maximum number of iterations has been reached (for example about 50) in which case the linear models corresponding to the highest number of inliers for all of the iterations performed are output as the final models.

This process enables simultaneous generation of lane and raised boundary models to determine parallel segments from the raised boundaries (e.g. kerbs) and lanes.

It will be appreciated that the steps of the method FIG. 4 may be not be performed in the order described, for example step 411 may be performed prior to or subsequent to the three steps 405, 407, 409.

In practice, the boundary detection method of FIG. 4 may be employed as the mobile object 100 moves along the routeway. The computing system 380 may then pass details of any identified boundaries to the controller 105 and the controller 105 may control operation of the mobile object 100 with respect to the routeway so as to navigate safely with respect to the identified boundaries.

Figure 8A:
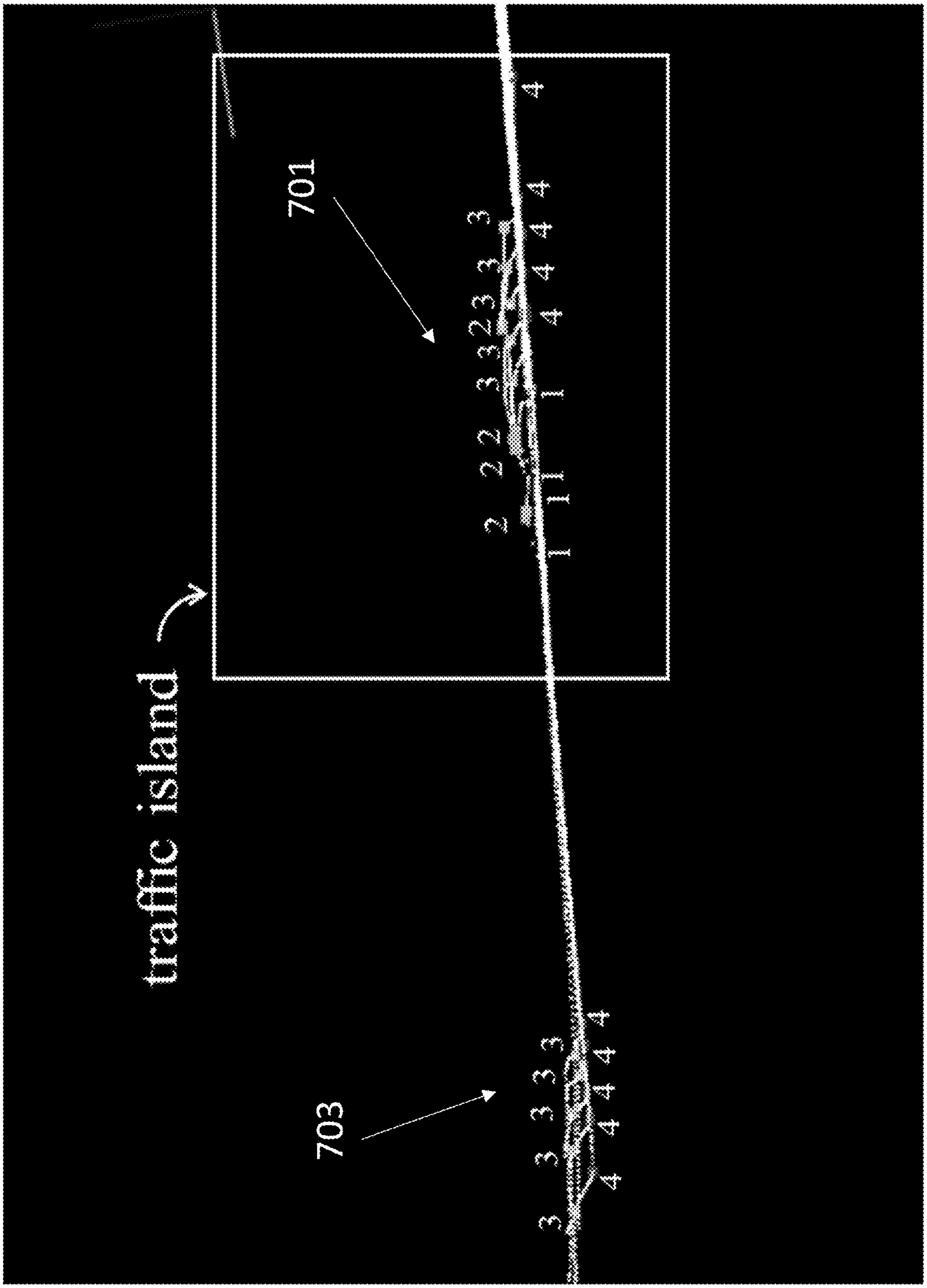
FIGS. 8*a* and 8*b* illustrate kerb detection results obtained using the method of FIG. 4.
Figure 8B:
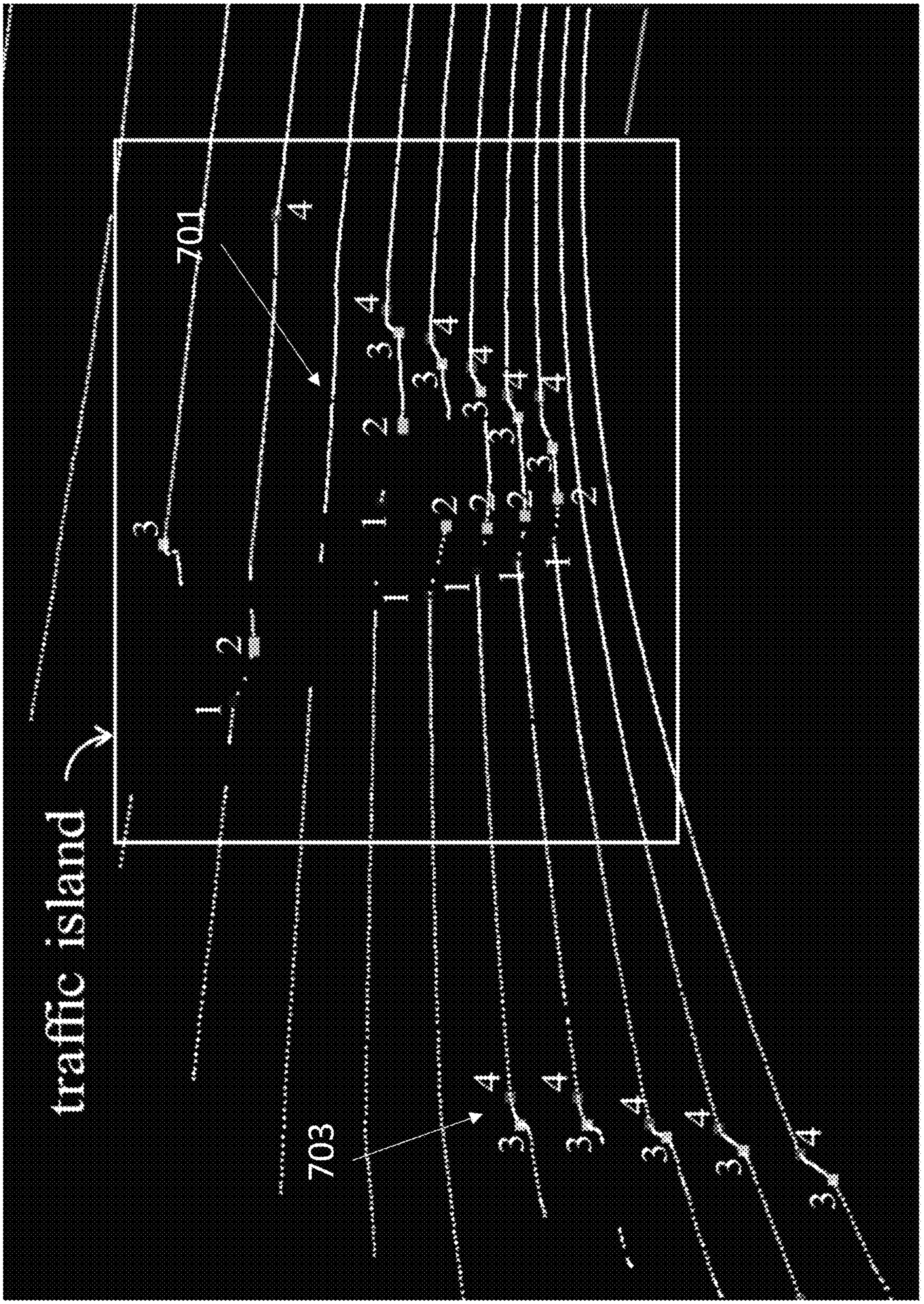

FIGS. 8*a* and 8*b* illustrate detection results obtained from LiDAR detection of an example routeway, specifically a road, including a traffic island 701 and a kerb 703 employing the method of FIG. 4. No lane markings were present. The obtained LiDAR data is shown with the raised boundary detection results obtained using the method of FIG. 4 illustrated. As will be appreciated from FIGS. 8*a* and 8*b*, right lower kerb edges 1, right upper kerb edges 2, left upper kerb edges 3 and left lower kerb edges 4 have been correctly detected, enabling accurate localization of the traffic island 701 and kerb 703. It is envisaged that based on the detected location of these features, the controller 105 may control operation of the mobile object 100 to navigate the mobile object 100 between the traffic island 701 and kerb 703.

Thus, methods and systems according to the described embodiment may provide an accurate and practical method of detecting boundary features, such as kerb and lane features, which may impact the navigation of mobile objects such as AVs and mobile robots. In particular, systems and methods according to the described embodiment may enable accurate detection of isolated kerb structures such as traffic islands and other relatively small road features which may form part of complex environments for manoeuvring the mobile object 100. It will be appreciated that the approach applied according to the described embodiment does not rely on assumptions of good road surface flatness, predefined thresholds for elevation filters, height gradient filters, or model-based filters, thereby enabling robustness to different and non-standard environments of the mobile object 100.

Particularly advantageous features of the method according to the described embodiment include focussing on local point linearity. This approach may enable pixel level accuracy of boundary edge detection from the LiDAR data. Performing side window linearity filtering as described above in relation to FIG. 6 and using it to filter the linearity of the point cloud may further enable high accuracy even in the presence of noise from the sensors or a non-perfect road surface while maintaining the edge points.

In addition, the pre- and post-processing performed (for example removing non-ground points, identifying isolated and left/right end points, side window analysis of linearity and verifying local region flatness, etc.) according to the described embodiment may enable as many as possible false detection results as possible to be eliminated which may also help to reduce the effects of non-prefect ground surfaces and sensor noise. In particular, detecting edge pairs based on monotonic increases in elevation of the LiDAR points may to segment the kerb surface. In addition, this constraint is valid for various types of kerb shapes.

Employing individual beam tracing to detect boundary edge points may enable a reduction in processing time/computation burden of the LiDAR data by partitioning the point cloud into several groups. Methods and systems according to the described embodiment may therefore be efficient thereby enabling real-time processing capability as required for in practice for the manoeuvring of mobile objects.

Further, employing a piecewise representation of a raised boundary may enable an accurate representation of the real-life shape of the raised boundary which may be particularly important for bus and cars manoeuvring near the raised boundary, for example a bus entering a bus bay.

Simultaneously optimizing lane markings and raised boundaries such as kerbs may enable accurate distinction to be made between lane markings and other types of road markings as the edges of other types of road markings may not be classified as part of the consensus set using the method of FIG. 7. It will be appreciated that a shape of a lane edge would be expected to be similar to a shape of a kerb edge. In contrast, a different type of road markings may not be expected to have a shape similar to that of a kerb. Simultaneously optimizing lane markings and raised boundaries such as kerbs exploits this distinction to potentially enable improvements in the accuracy of lane marking detection.

Employing LiDAR sensors as in the described embodiment may be advantageous as, in contrast to conventional camera sensors, LiDAR sensors may enable direct accurate 3D measurement which may be particularly well suited to inherently 3-D structures such as raised boundaries. Further, LiDAR sensors may the accurate measurement of distances on the order of centimetres and may not be sensitive to lighting conditions, even in dark conditions. Further LiDAR sensors typically have a wide horizontal field of view (FOV) of 360° and a high spatial resolution. For example, currently available mechanical spinning LIDARs may be able to achieve an angular resolution of up to 0.08°. Further, employing the individual beam tracing and identifying breakpoints in linearity as opposed to relying on large angle differences to distinguish between ground and kerb points may help to compensate for small relative angles between the projected points of the LiDAR laser beam on a kerb and on the ground at small pitch angles of the LiDAR device.

In summary, the described embodiment may offer the following advantages: 1. Efficient per-beam tracing for real time processing; 2. Pixel-level raised boundary edge candidate detection enabling accurate raised boundary fitting; 3. Pair-wise raised boundary edges association: upper and lower raised boundary edge points always appear in pair. Pair-wise association can therefore help to further reduce the false edge points detection; 4. Simultaneous optimization of lanes and raised boundaries: this constraint may reduce the influence of other road markings and noise of the raised boundary detection and results in accurate lane detection; 5. Piecewise linear models for raised boundary and lane fitting; raised boundary and lanes are designed in a piecewise manner. The piecewise representation may enable precise details of the road raised boundary to be obtained; 6.

Detection of other routeway raised boundary features: methods according to the described embodiment may enable the detection of other routeway raised boundary features such as traffic islands, speed humps, obstacles on a road, etc. and accurate lateral localization, road surface segmentation, terrain analysis and on-road safety checks.

It should be appreciated that the detection methods according to the described embodiment have broad potential application in robots and AV regularization and risk management, especially when used in relatively feature-less environments.

The described embodiment should not be construed as limitative.

For example, although the detection of lane markings (i.e. step 411) is described above, it is envisaged that lane marking detection may be omitted entirely. In such a variation, the optimization of step 413 will only take place for raised boundary edge points. Likewise, it is envisaged that this optimization may be performed using sets of lane edge marking candidates only (i.e. kerb-kerb or lane-lane optimization). For example, in cases in which no lane markings are present or lane markings are present but there are no raised boundaries. It should be appreciated that in this variation, fewer than four sets of identified points may be employed, for example only two sets of identified points may be employed.

Although several pre- and post-filtering processes are described above for the identified break points, it is envisaged that one or more of the described filtering processes for the identified break points may be omitted. For example, side-window filtering as described in relation to FIG. 6 may not be performed, for example, the single projected LiDAR points immediately neighbouring the point $p_{ij}$ in the $i^{th}$ beam alone may be alternatively employed as $p_{im}$ and $p_{in}$ in equation (1). Likewise, it is envisaged that further filtering of the identified break points may be performed according to embodiments.

It is envisaged that one or more of the components of the computing system 380 may be omitted or alternative or additional components may be included in the computing system 380 according to embodiments.

Although autonomous vehicles and mobile robots are described above as being examples of the mobile object 100, it is envisaged that the mobile object may instead be a device which controlled at least in part by a user. For example, the computing system 380 may provide information to the user based on which the user may control operation of the mobile object 100.

Although the simultaneous generation of the raised boundary models and the lane models is described above as employing raised boundary edge candidates obtained based on identifying break points in a linearity of consecutive LiDAR points (i.e. the steps 405 to 409 of FIG. 4), it is envisaged that the raised boundary edge candidates for the simultaneous generation of the raised boundary models and the lane models may be obtained using alternative methods.

Although lines of best fit are described above as being employed to identify breakpoints in a linearity of consecutive LiDAR points, it is envisaged that lines of best fit may not be employed. For example, as discussed above points $p_{im}$ and $p_{in}$ in equation (1) may simply be the two LiDAR points immediately adjacent to the point $p_{ij}$ (i.e. the two points either side of point $p_{ij}$). $|\angle p_{im} p_{ij} p_{in}|$ may therefore simply comprise the angle formed by three consecutive LiDAR points.

It is envisaged that features relating to one embodiment or variation may be combined with those relating to other embodiments or variations.

Having now fully described the invention, it should be apparent to one of ordinary skill in the art that many modifications can be made hereto without departing from the scope as claimed.

The invention claimed is:

1. A method of controlling an operation of a mobile object by detecting a lane and a raised boundary of a routeway, the mobile object comprising a LiDAR device, a computing system and a controller, comprising:

(i) receiving LiDAR data, by the computing system, of an environment of the mobile object captured by the LiDAR device, the LiDAR data comprising a plurality of beams, each beam comprising a plurality of projected points each captured according to a common pitch angle of the LiDAR device;

(ii) identifying a plurality of break points, by the computing system, each break point of the plurality of break points being in a respective linearity of consecutive projected points of at least one beam from the plurality of beams;

(iii) locating edge points of the raised boundary, by the computing system, from the plurality of identified break points;

(iv) extracting routeway marking edge points, by the computing system, from the LIDAR data using adaptive thresholding;

(v) locating lane edge points, by the computing system, based on the extracted routeway marking edge points, wherein locating the edge points of the raised boundary from the plurality of identified break points and locating the lane edge points based on the extracted routeway marking edge points comprises fitting parallel linear models to selected points of the plurality of identified break points and to selected points of the extracted routeway marking edge points respectively to simultaneously generate respective lane and raised boundary models; and (vi) controlling, by the controller, the operation of the mobile object based on detected lane and raised boundary of the routeway obtained using the lane and raised boundary models.

2. A method of detecting a raised boundary of a routeway for a mobile object according to claim 1, wherein identifying each respective break point of the plurality of break points further comprises:

determining selected consecutive projected points of the at least one beam including a respective candidate break point;

determining at least one opposing projected point of the at least one beam;

determining an angle between a selected linearity of the selected consecutive points and an opposing linearity of the at least one opposing projected point and the respective candidate break point; and identifying the respective break point based on the determined angle.

3. A method of detecting a raised boundary of a routeway for a mobile object according to claim 2, wherein determining the selected consecutive projected points of the at least one beam comprises:

determining first consecutive projected points of the at least one beam including the respective candidate break point;

determining second consecutive projected points of the at least one beam including the respective candidate break point;

comparing a first linearity of the first consecutive projected points with a second linearity of the second consecutive projected points; and selecting the first or second consecutive projected points as the selected consecutive projected points based on the comparison.

4. A method of detecting a raised boundary of a routeway for a mobile object according to claim 1, further comprising:

identifying height variations in selected projected points of the at least one beam adjacent to each of the identified break points in the at least one beam and filtering the identified plurality of break points based on the identified height variations, or grouping identified plurality of break points into pairs based on a monotonic change in a height of the projected points of the at least one beam between the respective break points of each pair; and locating upper and lower edge points of the raised boundary based on the group pairs.

5. A method of detecting a raised boundary of a routeway for a mobile object according to claim 1, further comprising:

identifying a first plurality of break points, each break point of the first plurality of break points being in a respective linearity of consecutive projected points of a first beam from the plurality of beams;

identifying a second plurality of break points, each break point of the second plurality of break points being in a respective linearity of consecutive projected points of a second beam from the plurality of beams;

locating first edge points of the raised boundary from the identified first plurality of break points;

locating second edge points of the raised boundary from the identified second plurality of edge points; and determining a piece-wise representation of the raised boundary by tracing straight lines from each of the first edge points to a respective one of the second edge points.

6. The method of controlling an operation of a mobile object according to claim 1, wherein fitting parallel linear models to selected points of the plurality of identified break points and to selected points of the extracted routeway marking edge points respectively to simultaneously obtain respective lane and raised boundary models comprises: applying random sample consensus (RANSAC) to optimize parameters of the parallel linear models with respect to the plurality of identified break points and the extracted routeway marking edge points, respectively.

7. A system for controlling an operation of a mobile object by detecting a lane and a raised boundary of a routeway, the system comprising:

(i) a LiDAR device arranged to capture LiDAR data of an environment of the mobile object at a plurality of pitch angles, the LiDAR data comprising a plurality of beams, each beam comprising a plurality of projected points each captured according to a common pitch angle of the plurality of pitch angles;

(ii) a processor of a computing system configured to:

a. identify a plurality of break points, each break point of the plurality of break points being in a respective linearity of consecutive projected points of at least one beam from the plurality of beams;

b. locate edge points of the raised boundary from the plurality of identified break points;

c. extract routeway marking edge points from the LiDAR data based on adaptive thresholding; and d. locate lane edge points based on the extracted routeway marking edge points, wherein the processor is configured to locate the edge points of the raised boundary from the plurality of identified break points and to locate the lane edge points based on the extracted routeway marking edge points by fitting parallel linear models to selected points of the plurality of identified break points and to selected points of the extracted routeway marking edge points respectively to simultaneously generate lane and raised boundary models; and (iii) a controller configured to control the operation of the mobile object based on detected lane and raised boundary of the routeway obtained using the lane and raised boundary models.

8. A system for detecting a raised boundary of a routeway for a mobile object according to claim 7, wherein the processor is configured to identify each respective break point of the plurality of break points by:

determining selected consecutive projected points of the at least one beam including a respective candidate break point;

determining at least one opposing projected point of the at least one beam;

determining an angle between a selected linearity of the selected consecutive points and an opposing linearity of the at least one opposing projected point and the respective candidate break point; and identifying the respective break point based on the determined angle.

9. A system for detecting a raised boundary of a routeway for a mobile object according to claim 8, wherein determining the selected consecutive projected points of the at least one beam comprises:

determining first consecutive projected points of the at least one beam including the respective candidate break point;

determining second consecutive projected points of the at least one beam including the respective candidate break point;

comparing a first linearity of the first consecutive projected points with a second linearity of the second consecutive projected points; and selecting the first or second consecutive projected points as the selected consecutive projected points based on the comparison.

10. A system for detecting a raised boundary of a routeway for a mobile object according to claim 7 wherein the processor is further configured to identify height variations in selected projected points of the at least one beam adjacent to each of the plurality of identified break points and to filter the plurality of identified break points based on the identified height variations, or group the plurality of identified break points into pairs based on a monotonic change in a height of the projected points of the at least one beam between the respective break points of each pair; and locate upper and lower edge points of the raised boundary based on the grouped pairs.

11. A system for detecting a raised boundary of a routeway for a mobile object according to claim 7, wherein the processor is further configured to:

identify a first plurality of break points, each break point of the first plurality of break points being in a respective linearity of consecutive projected points of a first beam from the plurality of beams;

identify a second plurality of break points, each break point of the second plurality of break points being in a respective linearity of consecutive projected points of a second beam from the plurality of beams;

locate first edge points of the raised boundary from the identified first break points;

locate second edge points of the raised boundary from the identified second edge points; and determine a piece-wise representation of the raised boundary by tracing straight lines from each of the first edge points to a respective one of the second edge points.

12. The system for controlling an operation of a mobile object according to claim 7, wherein fitting parallel linear models respectively to selected points of the plurality of identified break points and to selected points of the extracted routeway marking edge points respectively to simultaneously generate lane and raised boundary models comprises: applying random sample consensus (RANSAC) to optimize parameters of the parallel linear models with respect to the plurality of identified break points and the extracted routeway marking edge points, respectively.

13. A mobile object comprising a system for detecting a raised boundary of a routeway for a mobile object according to claim 7.

* * * * *